United States Patent Office 3,437,372
Patented Apr. 8, 1969

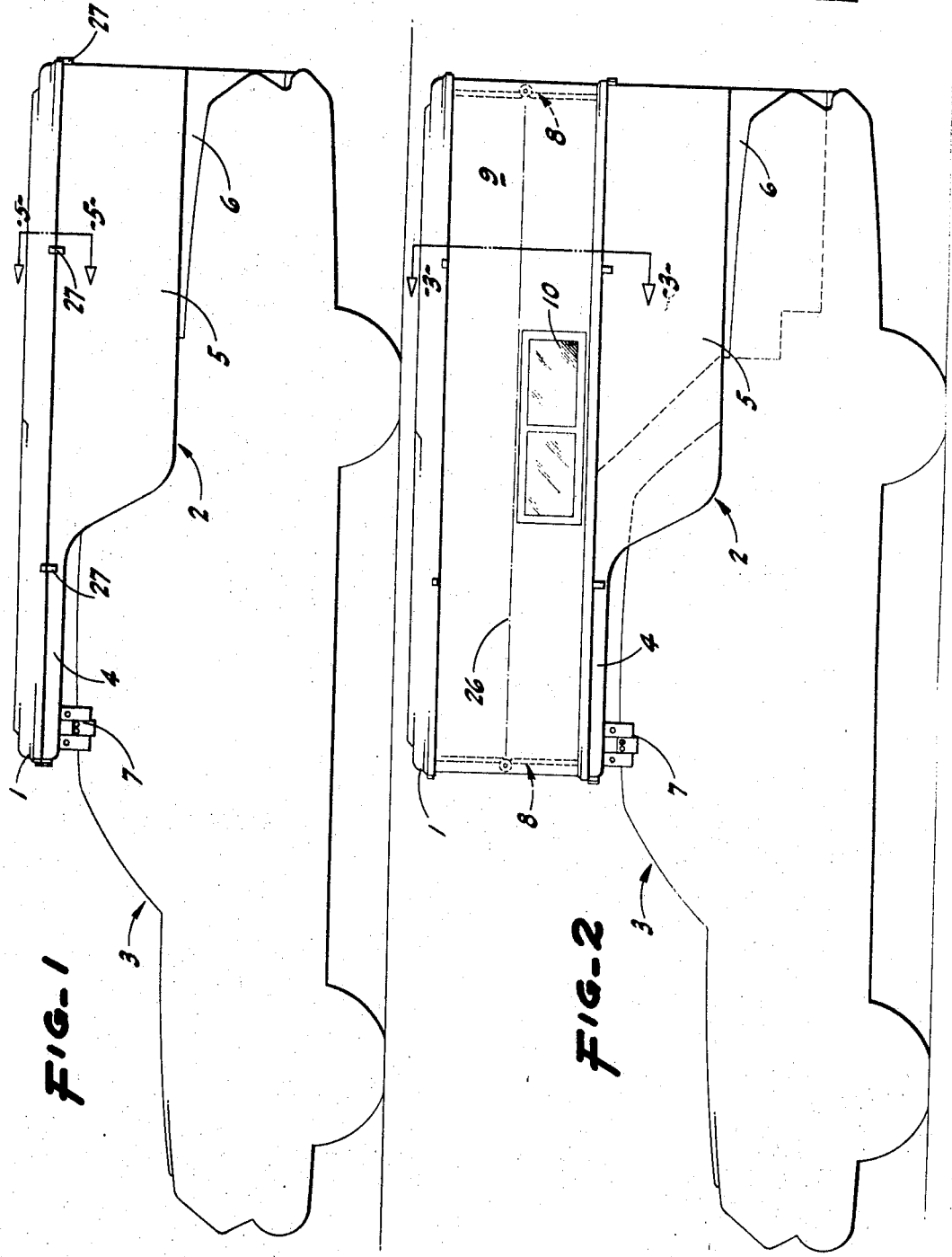

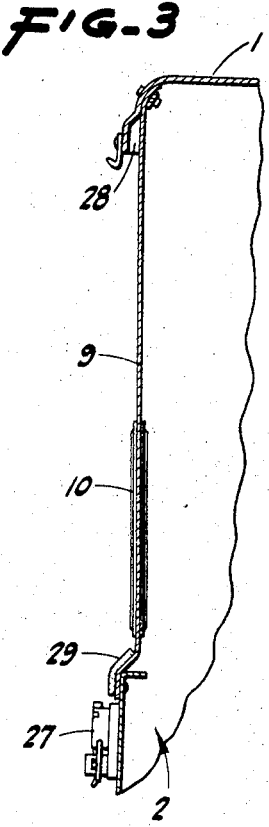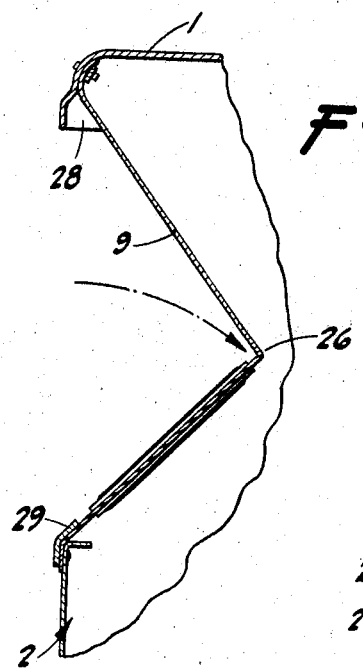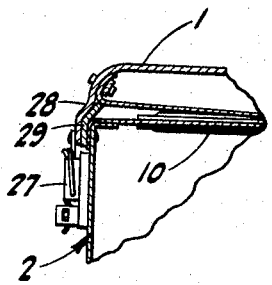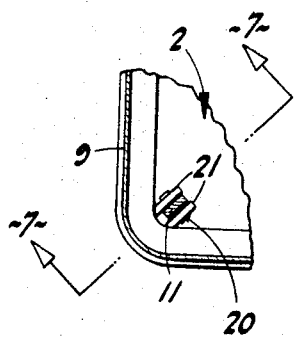

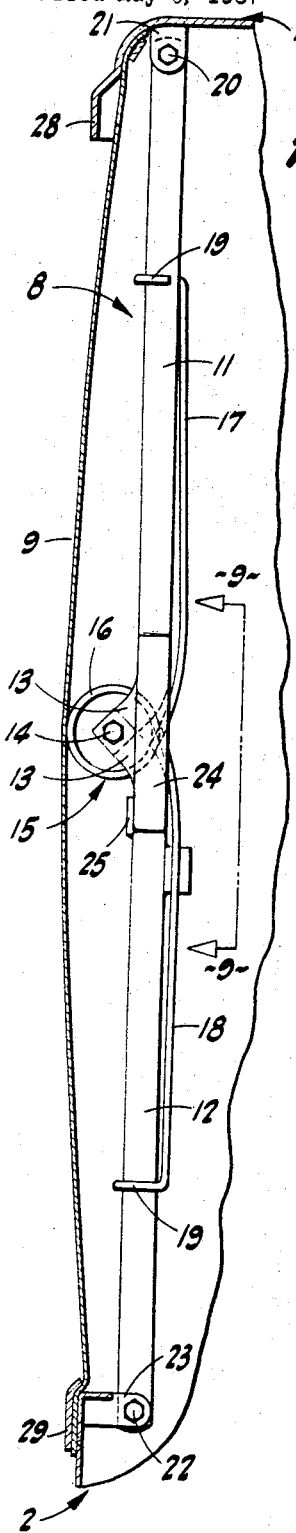
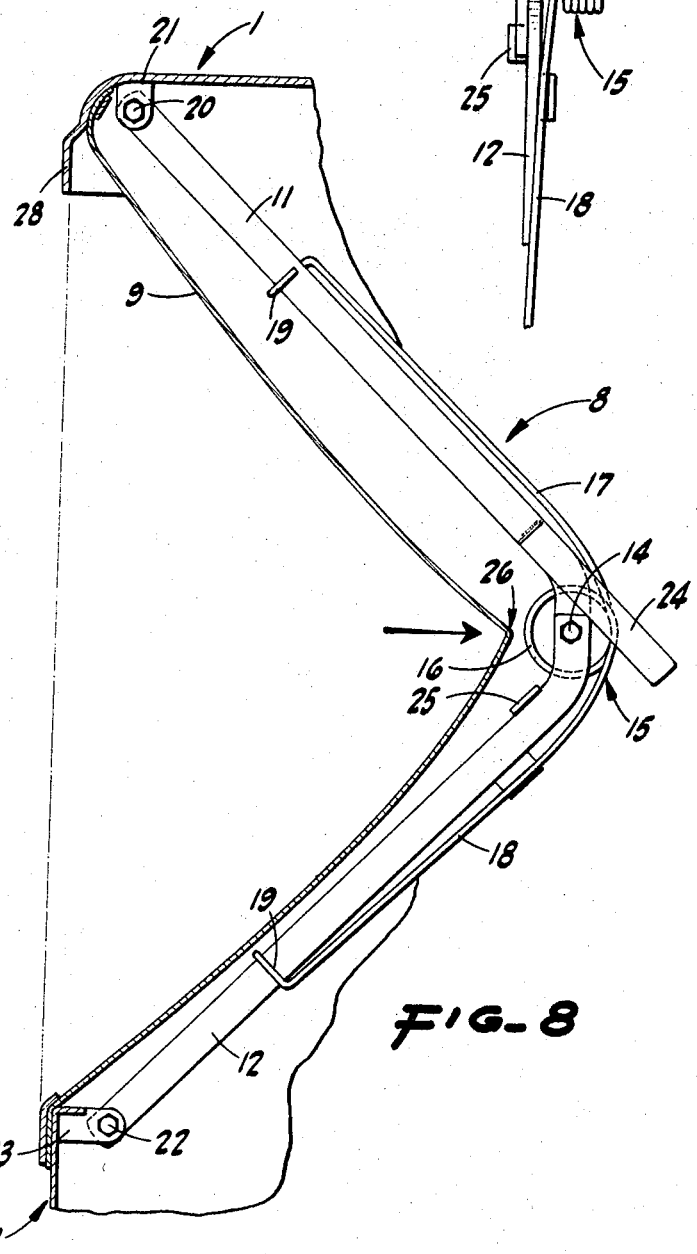
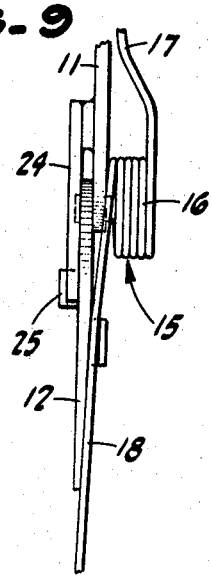

3,437,372
MOTOR VEHICLE CAMPER WITH
ELEVATING ROOF
Russell C. McGarry, Merced, Calif.
(109 Bennett Road, Aptos, Calif. 95003)
Filed May 5, 1967, Ser. No. 636,301
Int. Cl. B60p 3/34; E04b 7/16; B60j 7/12
U.S. Cl. 296—23
2 Claims

ABSTRACT OF THE DISCLOSURE

A motor vehicle camper having an elevating roof movable between a lowered position for travel and a raised position for use of the camper; there being means to support the roof in its raised position, and flexible curtains then spanning in closure relation between the roof and the main body of the camper.

Background of the invention

In motor vehicle campers having an elevating roof, the previous structures have in many instances been unduly complicated, expensive to manufacture, and not readily manipulated to raise or lower the roof. An improvement in such an elevating roof is disclosed in my pending United States patent application Ser. No. 430,222, now Patent No. 3,356,407, and the instant application is directed to a further improvement.

Summary of the invention

The present invention provides, as a major object, a motor vehicle camper having an elevating roof movable between a lowered position and a raised position and, in the latter position, being supported at each corner by an unfolded, over-dead-center articulated post connected between the roof and the main body of the camper.

The present invention provides, as another object, a motor vehicle camper, as in the preceding paragraph, wherein the articulated posts each include a heavy-duty spring arranged in a manner such that when the posts are downfolded and which occurs upon movement of the roof to its lowered position, the springs are loaded and so maintained by releasably latching the roof to the main body of the camper. Thereafter, and when it is desired to use the camper, the roof is unlatched and the spring-loaded posts—then relatively forcefully tending to unfold—automatically assist in manual movement of the roof to its raised position and at which time the posts pass beyond dead center and becomes stiff-leg supports.

The present invention provides, as an additional object, a motor vehicle camper, of the type described, which includes flexible curtains infolded below the roof when the latter is in lowered position and drawn relatively taut in closure relation between the roof and main body of the camper when said roof is in raised position; certain of the curtains being provided with lightweight windows which moves with such curtains when they are infolded.

The present invention provides, as a further object, a motor vehicle camper, of the type described, which includes an elevating roof and flexible curtain assembly which is designed for ease and economy of manufacture, ready installation, and convenience of use.

The present invention provides, as a still further object, a motor vehicle camper, of the type described, which includes a practical, reliable, and durable elevating roof and flexible curtain assembly.

Brief description of the drawings

FIG. 1 is a side elevation of the camper as automobile-mounted and with the roof lowered for travel.

FIG. 2 is a similar view but with the roof raised for use of the camper.

FIG. 3 is an enlarged fragmentary sectional elevation taken substantially on line 3—3 of FIG. 2.

FIG. 4 is a similar view but shows the roof lowered part way and the flexible curtain partially infolded beneath the roof.

FIG. 5 is likewise a similar view but shows the roof fully lowered and latched, with the flexible curtain as finally infolded beneath the roof.

FIG. 6 is an enlarged, fragmentary plan, partly broken away, of one corner of the roof; the view showing the pivotal connection of the upper end of the corresponding articulated post.

FIG. 7 is a fragmentary sectional elevation taken substantially on line 7—7 of FIG. 6; the view showing said corresponding articulated post erect and supporting the roof in raised position.

FIG. 8 is a similar view but shows the roof lowered part way and the post as initially inwardly buckled and partially downfolded.

FIG. 9 is a fragmentary elevation taken substantially on line 9—9 of FIG. 7; the view showing the main portion of the coil spring and adjacent parts of the post illustrated in said FIG. 7.

Description of the preferred embodiment

Referring now more particularly to the drawings and to the characters of reference marked thereon, the present invention represents improvements in a motor vehicle camper of the type including a rigid, lightweight, one-piece elevating roof 1 which in lowered position for travel (see FIG. 1) rests on the upper edge of the main body 2 of the camper.

The camper is here illustrated as mounted on a sedan-type automobile, indicated generally at 3, and said main body 2 of the camper includes a relatively shallow forward portion 4 which closely overhangs the top of the automobile, and a relative deep rear portion 5 which is extended downward as at 6 into the trunk of the automobile; the trunk lid being removed.

The camper is detachably secured to the automobile in any suitable fashion, including brackets 7 between the forward portion 4 and the top of such automobile.

When the roof 1 is in raised position for use of the camper (see FIG. 2), the forward portion 4 provides the sleeping area while the rear portion 5 provides the living area.

The elevating roof 1 is of elongated but rectangular form in plan and when in raised position is supported at each corner by an articulated but then unfolded and erect post indicated generally at 8; the structure and operation of each such post being hereinafter described in detail.

When the elevating roof 1 is in its raising position, and supported by the posts 8, a closure is provided between the periphery of said roof and the upper edge (which lies in a common horizontal plane) of the main body 2 of the camper; such closure being a flexible, waterproof curtain 9.

On each side of the camper and intermediate its ends the curtain is fitted with a flat, relatively thin, lightweight window unit 10 disposed in the lower part of the curtain 9. Such curtain is continuous about the camper, except at the rear where the curtain is parted to accommodate a folding door (not shown).

Each of the corner-disposed, articulated posts 8—by reference to the same when unfolded and standing erect in roof-supporting relation—comprises an upper section 11, a lower section 12, and out-bent dog-legs 13 at adjacent ends connected by a transverse pivot 14.

A heavy-duty coil spring, indicated generally at 15, is associated with each post 8 and comprises a coil 16 disposed in substantially coaxial relation to the pivot 14, and opposed, elongated arms 17 and 18 extending lengthwise of post sections 11 and 12, respectively; each of the arms 17 and 18 having an end hook 19 engaged with the corresponding post section from its outer edge. The coil spring 15 is wound in a manner so that when mounted as described, such spring—as loaded—forcefully tends to unfold the related articulated post to its erect, roof-supporting position.

Each post 8 is pivotally mounted at its ends for inward downfolding diagonally from each corner of the camper; the top end of the upper section 11 being pivoted, as at 20, between attachment ears 21 fixed to the roof 1, while the bottom end of each section 12 is pivoted, as at 22, to an attachment bracket 23 fixed to the main body 2.

When standing erect in roof-supporting relation, each post is—in effect—a "stiff-leg"; this for the reason that the pivot 14 has passed over dead center in an outward direction, i.e., opposite the direction of downfolding movement of the post. Such over-dead-center movement of the post is limited by a rigid finger 24 on post section 11, then lapping post section 12 and resting against a stop 25 on the latter.

With each post 8 standing erect, as a "stiff-leg" support, the roof 1 is fully raised and the flexible curtain 9 is drawn quite taut so as to not flap, due to wind, when the camper is in use.

When it is desired to lower the roof 1 from its raised position, manual pressure is applied (through the curtain 9) inwardly against each post 8 in the central zone thereof and until the post starts to downfold upon the pivot 14 passing dead center due to such inward pressure supplemented by the weight of the roof.

With the posts partially downfolded (see FIG. 8), the curtain is correspondingly infolded along an intermediate, horizontal fold line 26. Thereafter, the roof 1 is manually pushed down—against the loading being applied to the coil springs 15 as the posts continue to downfold—until such roof seats on the main body 2.

In such lowered position on the main body 2, the roof—for travel of the vehicle—is secured against accidental raising motion by means of a plurality of peripherally spaced, manually releasable, trunk-type latches 27; these latches being engaged while the roof is manually held down against the now fully loaded coil springs 15 acting on the completely downfolded posts 8.

When the roof 1 is in its lowered, latched-down position, the curtain 9 lies folded in its entirety under such roof, and the window units 10 are horizontal in the bottom fold of such curtain.

Also, in the lowered position of the roof 1, an outwardly offset, depending peripheral flange 28 thereon closely laps an exterior, upper edge molding 29 on the main body 2 to provide an effective closure against dust or rain entry.

To move the roof 1 to raised position for the next use of the camper, the latches 27 are first released whereupon—without more—the downfolded posts 8, under the influence of the loaded coil springs 15, partially unfold and part way elevate the roof above the main body 2. Then the roof is manually pushed up to fully raised position and at which time the posts 8 unfold to erect position and snap beyond dead center to their "stiff-leg" condition to thereafter effectively support the roof in said raised position. During this operation, the curtains automatically unfold and then span taut between the roof and said main body, with the window units 10 vertical and facing laterally for use.

From the foregoing description, it will be readily seen that there has been produced such a motor vehicle camper with elevating roof as substantially fulfills the objects of the invention, as set forth herein.

While this specification sets forth in detail the present and preferred construction of the motor vehicle camper with elevating roof, still in practice such deviations from such detail may be resorted to as do not form a departure from the spirit of the invention, as defined by the appended claims.

I claim:
1. A motor vehicle camper comprising a main body, an elevating roof movable between a lowered position on the body for travel and a raised position above the body for use of the camper, a flexible curtain attached to and providing a closure spanning between the main body and the roof when the latter is in raised position, and spaced articulated posts, connected at one end to the main body and at the other end to the roof, inwardly of the curtain; the posts being downfolded beneath the roof in the lowered position thereof and unfolded and standing erect closely adjacent the curtain in an over-dead-center stop position supporting the roof in raised position, the posts being disposed so that, when standing erect, manual pressure exerted intermediately thereon from exteriorly of and through the flexible curtain buckles said posts in a downfolding direction.

2. A camper, as in claim 1, including vertical corners when the roof is in raised position; the posts, when unfolded and standing erect, being disposed in corresponding corners, and such posts being pivotally connected at the ends to main body and roof for inward downfolding diagonally from said corresponding corners.

References Cited
UNITED STATES PATENTS

| | | | |
|---|---|---|---|
| 3,376,059 | 4/1968 | Corl | 296—26 X |
| 3,184,261 | 5/1965 | Young | 296—26 |
| 3,160,435 | 12/1964 | Smith | 296—23 |
| 2,984,515 | 5/1961 | Hocks | 296—23 |
| 1,823,649 | 9/1931 | Goldberg | 287—86 |
| 1,674,215 | 6/1928 | Montgomery | 296—23 |

PHILIP GOODMAN, *Primary Examiner.*

U.S. Cl. X.R.
52—66; 296—27